United States Patent [19]

Pieper et al.

[11] Patent Number: 5,032,161
[45] Date of Patent: Jul. 16, 1991

[54] APPARATUS FOR MELTING ASBESTOS-CONTAINING WASTE MATERIAL IN GLASS

[75] Inventors: Helmut Pieper; Hartmut Zschocher; Matjaz Bucar, all of Lohr, Fed. Rep. of Germany

[73] Assignee: Beteiligungen Sorg GmbH & Co. KG, Lohr, Fed. Rep. of Germany

[21] Appl. No.: 407,905

[22] Filed: Sep. 15, 1989

[51] Int. Cl.⁵ .............................................. C03B 5/16
[52] U.S. Cl. .......................................... 65/335; 65/27; 65/181
[58] Field of Search ........................... 65/27, 181, 335; 55/228, 267

[56] References Cited

U.S. PATENT DOCUMENTS

| | | | |
|---|---|---|---|
| 3,728,094 | 4/1973 | Bowman | 65/27 |
| 4,311,502 | 1/1982 | Propster | 65/27 |
| 4,353,726 | 10/1982 | Rough | 65/27 |
| 4,652,289 | 3/1987 | Drouet et al. | 65/27 |
| 4,666,490 | 5/1987 | Drake | 65/27 |
| 4,696,690 | 9/1987 | Roloff | 65/27 |

FOREIGN PATENT DOCUMENTS

| | | | |
|---|---|---|---|
| 2719339 | 11/1978 | Fed. Rep. of Germany | 65/27 |
| 28511 | 3/1977 | Japan | 65/27 |

Primary Examiner—Joye L. Woodard
Attorney, Agent, or Firm—Felfe & Lynch

[57] ABSTRACT

Apparatus includes a furnace for vitrifying waste material, a storage container for delivering waste material to the furnace and a pipe for passing a heat transfer medium through the storage container to preheat the waste material and remove water therefrom. The pipe may be a pipe through which exhaust gas is passed or a pipe through which a liquid medium is passed after heat transfer from the exhaust gas. The apparatus further includes means for removing dust from the exhaust gas and heating same to break down dioxines and furanes therein.

7 Claims, 3 Drawing Sheets

APPARATUS FOR MELTING ASBESTOS-CONTAINING WASTE MATERIAL IN GLASS

BACKGROUND OF THE INVENTION

The invention relates to an apparatus for melting asbestos-containing waste material, including a furnace into which the waste material with batch for melting the glass is charged and from which the molten glass is withdrawn.

It is known to render asbestos-containing waste material inert by vitrification, a process which does not require depositing the material in a special hazardous waste disposal site. The glass so obtained can either be used or deposited on regular waste disposal sites.

U.S. Pat. No. 4,948,411 already suggests a furnace for melting glass while adding asbestos-containing waste material. Since the melting is carried out electrically only small amounts of exhaust gas develop which are easy to purify.

It has now turned out that asbestos-containing waste material contains to a certain extent larger amounts of plastic materials. This results in the disadvantage that dioxines and furanes can develop in the glass melting furnace which contaminate the furnace exhaust gas.

Further, it turned out that parts of the delivered asbestos-containing material are not only moist but also that free water can develop. In case this water reaches the furnace it causes explosions which can damage or destroy the furnace and endanger the lives of the operating crew.

SUMMARY OF THE INVENTION

It is now an object to find a solution to the aforesaid problems and provide a simply structured apparatus for sealing asbestos-containing waste material in glass during a melting process avoiding explosions in the furnace and further, avoiding in particular that the exhaust gases contain dioxines or furanes or like toxic materials.

Moreover, the apparatus is to be operated continuously and must ensure a best possible protection of the operating crew.

Furthermore, the apparatus should exhibit a low energy consumption and in the long run operate trouble-free.

Overall, the invention is to provide a solution to manufacture asbestos-containing waste material such that the asbestos is rendered completely inert and does not pollute the environment in any way.

The object is accomplished with an apparatus of the aforesaid kind including a furnace into which the waste material with the batch for melting the glass is charged and from which the molten glass is withdrawn, including a storage container for the waste material delivered so as to ensure the continuous operation of the furnace and wherein the exhaust gas is purified and dust is removed as are dioxines and furanes and including means for passing a liquid or gaseous heat transfer medium through the storage container of the waste material.

It turned out that asbestos-containing material is generally delivered in irregular intervals whereas the furnace must be operated continuously. Hence, a container is required for storing the waste material which ensures the continuous operation of the furnace over a longer period of time, e.g. several months, even without additional deliveries. Such delivery intervals can occur when, during winter time for example, weather conditions do not allow demolition work. The container must have a volume large enough to compensate the natural interruption in delivery and ensure the continuous operation even during several successive holidays.

As means for passing exhaust gases through the waste material a further advantageous embodiment has a meander-like pipe disposed in or above the bottom of the storage container.

The bottom of the storage container is provided with at least one aperture permitting the accumulating water from the moist waste material to pass through; advantageously, the bottom can be provided with a water collecting basin which has a water outlet and is disposed below.

Advantageously, the storage container for the waste material is provided with a cover which has outlets for the air contained in the container while simultaneously filtering the air and refeeding the filtered dust into the waste material.

This device for purifying the exhaust gas from dioxine and furanes can advantageously include at least one chamber in which the gas is heated up completely and for a sufficient period of time to a temperature which positively eliminates the dioxines and the furanes.

In order to ensure that the exhaust gas flow is completely heated up and cold current paths are avoided and that the heating up is carried out over a sufficiently long period of time, the chamber advantageously is meander-like and the heating is carried out in the foremost part of the chamber with respect to the flow direction.

Obviously, the apparatus in accordance with the invention has a simple design and the accomplishment can be considered as ideal since the furnace which is the core of the apparatus as well as all other components are made of conventional parts and material, the environment is completely free of pollution, and operation is ensured over a longer period of time.

DETAILED DESCRIPTION OF THE PREFERRED EMBODIMENT

Figure 1:
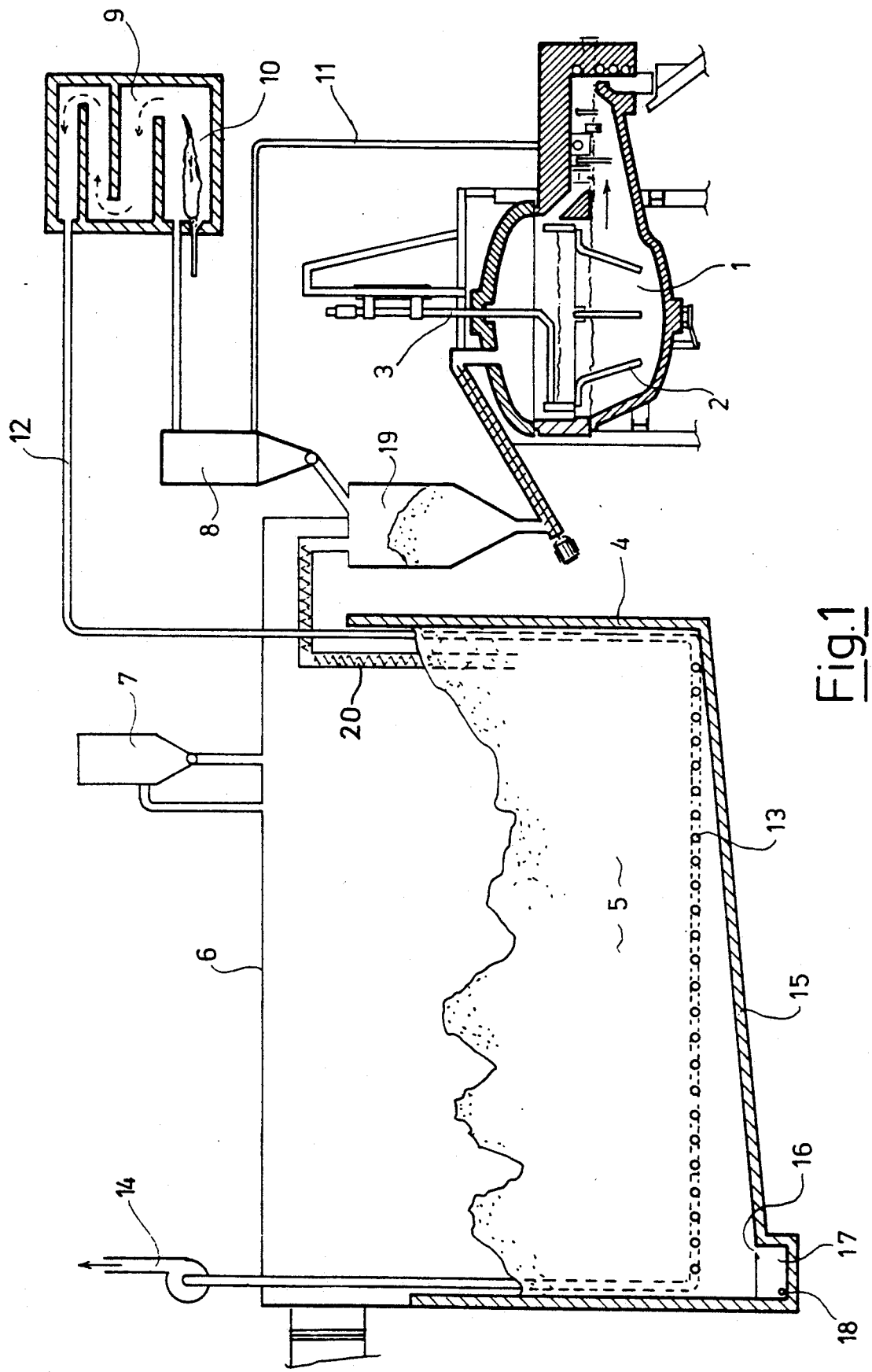
FIG. 1 is a diagrammatical representation of an apparatus for melting the asbestos-containing waste material including a afterburner.

The furnace 1 is composed of conventional parts and is provided with electrodes 2 and a skimming arm 3 which evenly distributes the introduced batch inclusive of the asbestos-containing waste material on the surface of the melt bath. The design of the arm, particularly for adjusting the desired thickness of the glass gall layer on the glass melt, is already described in U.S. Pat. No. 4,948,411 and a description thereof can hence be omitted. However, it is essential that the furnace prevents exhaust gases from escaping, i.e. that it is enclosed by a protective cover or the pressure and the gas flow therein are adjusted such that no toxic gas can escape.

Further, the apparatus includes a storage container 4 for the waste material 5; the container 4 is also provided with a cover 6. Means 7 for removing air from the container are placed on the cover and it is ensured that the dust collected in the filters of these means 7 is directly refed to the waste material.

The waste material is withdrawn from the container 4 via suitable conveyors 20 and supplied to a supply silo 19 from which the furnace 1 is charged while the remaining batch components like sand, etc. are simultaneously added.

Via a gas exhaust pipe 11, the exhaust gas is fed to a filter or a dust removing device 8 and it is ensured that the dust removed is directly fed to the supply silo 19.

The exhaust gas reaches a meander-like combustion chamber 9 at the beginning of which the gas flow is heated up by a gas flame 10. Instead of using a flame for heating, an indirect or a direct electric heating can be provided to reduce the total amount of exhaust gas.

Via pipes 12, the exhaust gas now free of dioxines and furanes is supplied to the container 4 and passes through the meander-like pipe 13 and is finally released into the environment via an exhaustor 14.

It is of particular advantage that during the cooling of the exhaust gases, the latter heats up the waste material 5 to such an extent that the moisture is reduced so as to correspondingly reduce the melting energy in the furnace 1. At the same time, the generation of free water, unless it is withdrawn from the container 4, is prevented.

The bottom 15 of the container is inclined and provided with at least one aperture 16 through which free water possibly present can flow into a water collecting basin 17. From the latter it can be withdrawn via an outlet 18.

The furnace combines an improved energy consumption with a secure and complete purification of the exhaust gases; at the same time, a sufficiently large buffer container is provided for the asbestos-containing waste material which is delivered.

Figure 2:
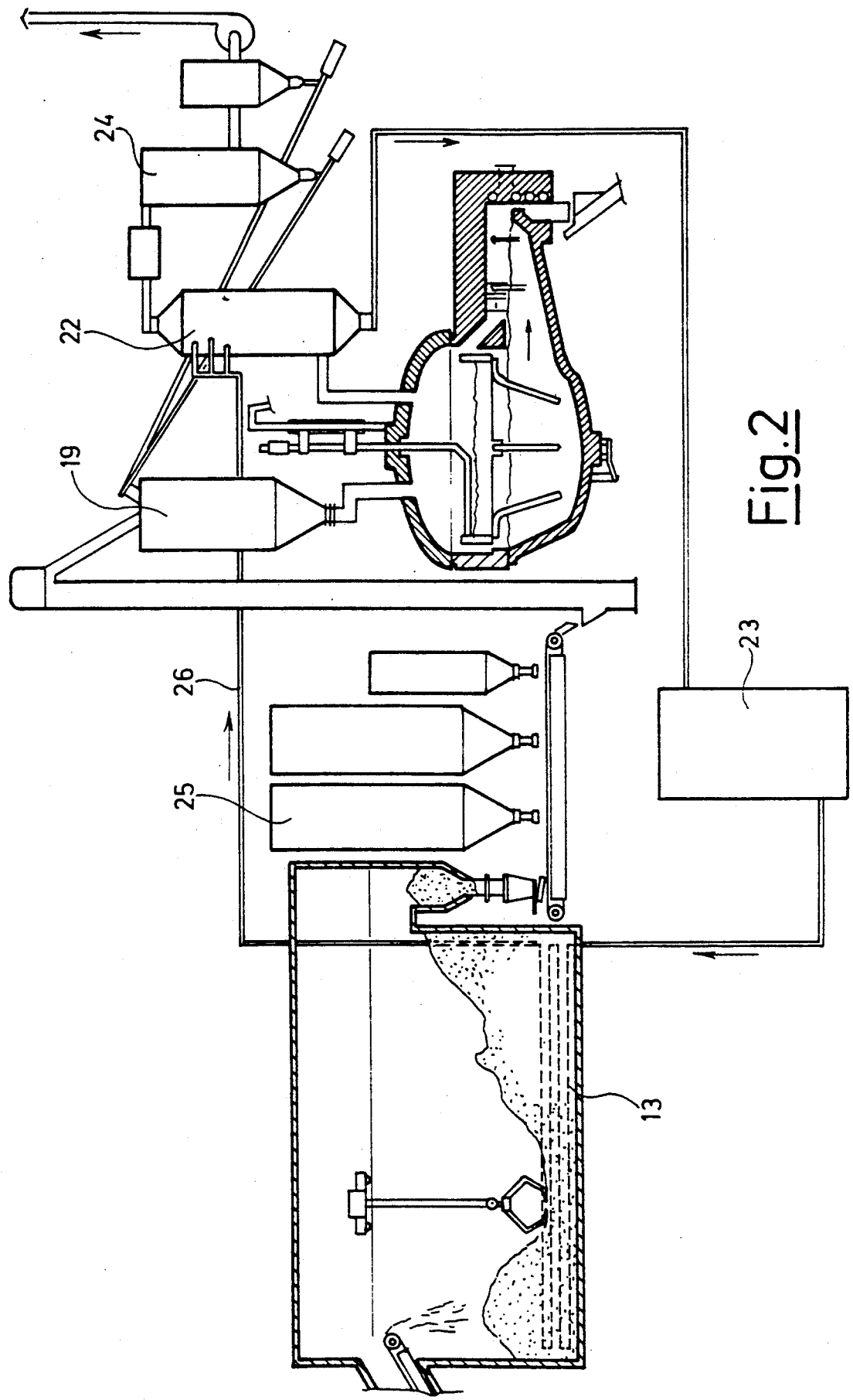
FIG. 2 is an apparatus in accordance with the invention wherein the container for the waste material is heated up by means of a liquid medium and FIG. 3 is an apparatus wherein the energy necessary for drying the waste material is generated by introducing hot gas.

According to FIG. 2 the exhaust gas can first be supplied to a condenser or wet washing device 22 where the exhaust gas is cooled down to temperatures below the boiling point. The exhaust gas is then purified in an activated carbon filter 24 and released into the atmosphere. After loading with dioxine or furanes or other hazardous substances the activated carbon, in turn, can be reintroduced into the supply silo from where it reaches the furnace chamber in which the dioxines or the furanes the other hazardous substances are eliminated.

From the condenser or wet washer 22 the water which is heated up close to the boiling point by the exhaust gas passes through a filtering device 23 into the pipe 13 in the waste material storage container 4; there it heats up the waste material such that the energy is withdrawn from the water and the waste material 5 is successfully predried.

Via a pipe 26 the now cool water is reintroduced to the condenser or wet washer 22.

Via suitable conveying means and metering devices the waste material is transported after predrying to the supply silo 19; the additives necessary for the glass production are fed via at least one batch silo 25.

Figure 3:
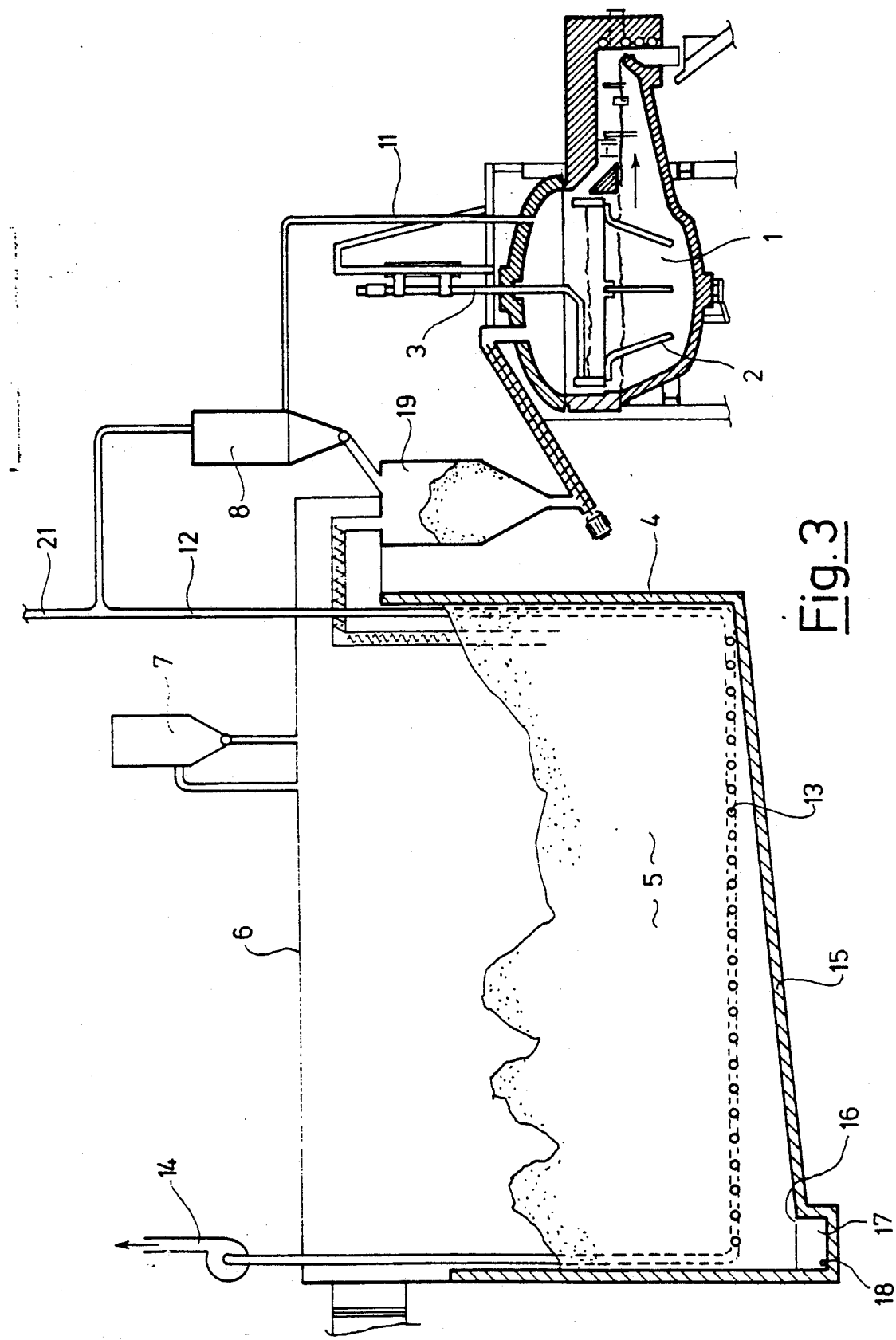

In a further embodiment according to FIG. 3, the withdrawn gas 11 is mixed with hot gas supplied through pipe 21 after dust has been removed from the withdrawn gas in a dust removing device 8. The mixed gas is supplied through pipe 12 to the waste material storage container 4. It is thus possible to add the amounts of energy required for predrying the waste material 5 to the container 4 while it is not necessary to indirectly supply considerable electric energy via the electrodes 2 in order to carry out the predrying or to generate water vapor.

What is claimed is:

1. Apparatus for melting asbestos waste material, comprising
    a furnace into which the waste material together with batch for forming glass is charged and from which molten glass is withdrawn, said furnace producing exhaust gas,
    a storage container for delivering waste material to the furnace so as to ensure continuous operation of the furnace,
    scrubbing means for cooling the exhaust gas and removing dust from the exhaust gas, said scrubbing means passing a liquid head transfer medium therethrough,
    means for purifying the exhaust gas to remove dioxines and furanes therefrom, and
    means for passing said heat transfer medium through the storage container in order to cool said heat transfer medium while preheating the waste material.

2. An apparatus in accordance with claim 1, wherein the means for passing the heat transfer medium through the storage container is a pipe which is disposed in the storage container.

3. An apparatus in accordance with claim 2 wherein the pipe has a meander-like form.

4. Apparatus as in claim 1 wherein said storage container has an aperture for draining water from the bottom thereof, said apparatus further comprising a water collecting basin beneath said aperture, said basin having an outlet for withdrawing said water.

5. Apparatus as in claim 1 wherein said scrubbing means comprises
    a condenser to which the exhaust gas is supplied,
    said condenser passing said liquid heat transfer medium therethrough,
    means for feeding said liquid heat transfer medium to said means for passing the heat transfer medium through said storage container.

6. Apparatus as in claim 1 wherein said scrubbing means comprises
    a wet washer to which the exhaust gas is supplied, said wet washer passing said liquid heat transfer medium therethrough,
    means for feeding said liquid heat transfer medium to said means for passing the heat transfer medium through said storage container.

7. Apparatus as in claim 6 further comprising a filter for the liquid heat transfer medium downstream of the wet washer.

* * * * *